(12) United States Patent
Joshi et al.

(10) Patent No.: US 12,229,080 B2
(45) Date of Patent: Feb. 18, 2025

(54) SYSTEM AND METHOD FOR EXPRESSION PARSER, INVOKER AND TRANSFORMATION OF DATA

(71) Applicant: JPMorgan Chase Bank, N.A., New York, NY (US)

(72) Inventors: Amit Joshi, Frisco, TX (US); Hans P Nirmal, Frisco, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 79 days.

(21) Appl. No.: 17/945,572

(22) Filed: Sep. 15, 2022

(65) Prior Publication Data

US 2024/0095209 A1 Mar. 21, 2024

(51) Int. Cl.
*G06F 16/11* (2019.01)

(52) U.S. Cl.
CPC .................. *G06F 16/116* (2019.01)

(58) Field of Classification Search
CPC .................................................. G06F 16/116
USPC .......................................................... 707/756
See application file for complete search history.

(56) References Cited

U.S. PATENT DOCUMENTS

| | | | |
|---|---|---|---|
| 2015/0186504 A1* | 7/2015 | Gorman | G06F 40/30 707/752 |
| 2015/0324439 A1* | 11/2015 | Bhave | H04L 43/04 707/607 |
| 2019/0238952 A1* | 8/2019 | Boskovich | G06F 16/7837 |
| 2021/0157858 A1* | 5/2021 | Stevens | G06F 40/279 |
| 2022/0215028 A1* | 7/2022 | Nanda | G06F 16/24568 |
| 2022/0229986 A1* | 7/2022 | Narendula | G06F 40/253 |
| 2022/0326880 A1* | 10/2022 | Cook | G06F 16/221 |

* cited by examiner

*Primary Examiner* — Hosain T Alam
*Assistant Examiner* — Saba Ahmed
(74) *Attorney, Agent, or Firm* — GREENBLUM & BERNSTEIN, P.L.C.

(57) ABSTRACT

Various methods, apparatuses/systems, and media for data migration readiness of a target data source are disclosed. A processor hosts an application on a cloud server; receives data corresponding to the application from a plurality of types of data sources; defines expressions to be applied to the data for parsing and transforming the data dynamically on the cloud server; validates the defined expressions based on a determination that each defined expression meets a predefined threshold value; generates a lookup data file in a predefined file format in response to validating the defined expressions; parses the lookup data file; dynamically transforms the data based on the parsed lookup data file and applying the validated expressions; and generates an output file in the predefined file format for consumption after transforming the data.

17 Claims, 8 Drawing Sheets

SYSTEM AND METHOD FOR EXPRESSION PARSER, INVOKER AND TRANSFORMATION OF DATA

TECHNICAL FIELD

This disclosure generally relates to data processing, and, more particularly, to methods and apparatuses for implementing a platform and language agnostic dynamic data processing module configured to create a library or a framework that enables parsing and transforming of data dynamically and dynamic processing of expressions to be applied to the data hosted on an application server without depending on Structured Query Language (SQL) Server Reporting Services (SSRS).

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Today, a wide variety of business functions are commonly supported by software applications and tools, i.e., business intelligence (BI) tools. For instance, software has been directed to data processing, data migration, monitoring, performance analysis, project tracking, and competitive analysis, to name but a few. In general, large enterprises, corporations, agencies, institutions, and other organizations are facing a continuing problem of handling, processing, and/or accurately describing a vast amount of data (often exceeding 450 PB) that are crucial to plan actions at store level or market/regional level in an efficient and expedited manner. The stored data is often not in a centralized location, yet needs to be analyzed by a variety of persons within the organization to inform strategy, which may prove to be extremely time consuming, confusing, and inaccurate. The problems multiples when applications are hosted on cloud.

For example, SSRS is a server-based report generating software system from Microsoft. It is part of a suite of Microsoft SQL Server services, including SQL Server Analysis Services (SSAS) and SQL Server Integration Services SSIS. Administered via a Web interface, it can be used to prepare and deliver a variety of interactive and printed reports. Today, SSRS is being used to parse and transform data dynamically. The data is transformed based on the expressions provided in the reporting file. Traditionally, this process works well when the applications are hosted on-premise, i.e., on users' own business' computers and servers. But it creates a dependency on SSRS while moving to cloud (where applications are hosted on cloud, i.e., on third party vendors' server (application server) and accessed via a web browser). Currently, there is no tool that can remove this SSRS dependency in parsing and transforming data dynamically while hosting applications on cloud.

SUMMARY

The present disclosure, through one or more of its various aspects, embodiments, and/or specific features or sub-components, provides, among other features, various systems, servers, devices, methods, media, programs, and platforms for implementing a platform and language agnostic dynamic data processing module configured to create a library or a framework that enables parsing and transforming of data dynamically and dynamic processing of expressions to be applied to the data hosted on an application server without depending on SSRS, but the disclosure is not limited thereto.

For example, the present disclosure, through one or more of its various aspects, embodiments, and/or specific features or sub-components, also provides, among other features, various systems, servers, devices, methods, media, programs, and platforms for implementing a platform and language agnostic dynamic data processing module that: allows data to not to leave the system for processing—unlike SSRS where data has to leave the system and is processed on SSRS Server; processes vast amount of data (often exceeding 450 PB) faster than conventional tools; is configured for processing a data stream and/or continuously flowing data; allows adding any new custom formulae or expressions needed for data processing; allows data procurement from a plurality of types of data sources; provides full control on the source code—can make enhancements or updates or changes as required; is configured for lightweight processing (a lightweight processing is an application/software development method that has only a few rules and practices, or only ones that are easy to follow) and without dependency on external components; is configured for easy integration with other projects; and has the ability to be hosted as a separate service, but the disclosure is not limited thereto.

According to an aspect of the present disclosure, a method for dynamic data processing on a cloud environment by utilizing one or more processors along with allocated memory is disclosed. The method may include: hosting an application on a cloud server; receiving data corresponding to the application from a plurality of types of data sources; defining expressions to be applied to the data for parsing and transforming the data dynamically on the cloud server; validating the defined expressions based on a determination that each defined expression meets a predefined threshold value; generating a lookup data file in a predefined file format in response to validating the defined expressions; parsing the lookup data file; dynamically transforming the data based on the parsed lookup data file and applying the validated expressions; and generating an output file in the predefined file format for consumption after transforming the data.

According to a further aspect of the present disclosure, the data may be a data stream, and the method may further include: loading the entire lookup data file in a memory; applying the defined expressions on the data stream for processing; saving the processed data stream into an intermediate file; loading the processed data into the memory for additional operations; reading the entire intermediate file when it is determined that additional operations are needed; executing the additional operations; dynamically transforming the data based on executing the additional operations; and saving the dynamically processed data back to the lookup data file in the predefined file format for consumption.

According to another aspect of the present disclosure, the additional operations may include one or more of the following: grouping operations, row splitting operations, and filtering operations, but the disclosure is not limited thereto.

According to yet another aspect of the present disclosure, the predefined file format may include one or more of the following file formats: Java Script Object Notation file format, Comma Separated Values (CSV) file format, data table file format, dictionary file format, PDF file format, and excel file format, but the disclosure is not limited thereto.

According to an aspect of the present disclosure, the cloud server may be a public cloud server or a private cloud server.

According to a further aspect of the present disclosure, the method may further include: validating the defined expressions for syntax and expected calculation processes by comparing with prestored library of functions corresponding to data transformation.

According to another aspect of the present disclosure, the defined expressions may include one or more of the following expressions: calculation expressions, grouping expressions, filtering expressions, sorting expressions, and row visibility expressions, but the disclosure is not limited thereto.

According to an aspect of the present disclosure, a system for dynamic data processing on a cloud environment is disclosed. The system may include: a processor; and a memory operatively connected to the processor via a communication interface, the memory storing computer readable instructions, when executed, may cause the processor to: host an application on a cloud server; receive data corresponding to the application from a plurality of types of data sources; define expressions to be applied to the data for parsing and transforming the data dynamically on the cloud server; validate the defined expressions based on a determination that each defined expression meets a predefined threshold value; generate a lookup data file in a predefined file format in response to validating the defined expressions; parse the lookup data file; dynamically transform the data based on the parsed lookup data file and applying the validated expressions; and generate an output file in the predefined file format for consumption after transforming the data.

According to a further aspect of the present disclosure, the data may be a data stream, and the processor may be further configured to: load the entire lookup data file in a memory; apply the defined expressions on the data stream for processing; save the processed data stream into an intermediate file; load the processed data into the memory for additional operations; read the entire intermediate file when it is determined that additional operations are needed; execute the additional operations; dynamically transform the data based on executing the additional operations; and save the dynamically processed data back to the lookup data file in the predefined file format for consumption.

According to another aspect of the present disclosure, the processor may be further configured to: validate the defined expressions for syntax and expected calculation processes by comparing with prestored library of functions corresponding to data transformation.

According to an aspect of the present disclosure, a non-transitory computer readable medium configured to store instructions for dynamic data processing on a cloud environment is disclosed. The instructions, when executed, may cause a processor to perform the following: hosting an application on a cloud server; receiving data corresponding to the application from a plurality of types of data sources; defining expressions to be applied to the data for parsing and transforming the data dynamically on the cloud server; validating the defined expressions based on a determination that each defined expression meets a predefined threshold value; generating a lookup data file in a predefined file format in response to validating the defined expressions; parsing the lookup data file; dynamically transforming the data based on the parsed lookup data file and applying the validated expressions; and generating an output file in the predefined file format for consumption after transforming the data.

According to a further aspect of the present disclosure, the data may be a data stream, and the instructions, when executed, may cause the processor to further perform the following: loading the entire lookup data file in a memory; applying the defined expressions on the data stream for processing; saving the processed data stream into an intermediate file; loading the processed data into the memory for additional operations; reading the entire intermediate file when it is determined that additional operations are needed; executing the additional operations; dynamically transforming the data based on executing the additional operations; and saving the dynamically processed data back to the lookup data file in the predefined file format for consumption.

According to another aspect of the present disclosure, the instructions, when executed, may cause the processor to further perform the following: validating the defined expressions for syntax and expected calculation processes by comparing with prestored library of functions corresponding to data transformation.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
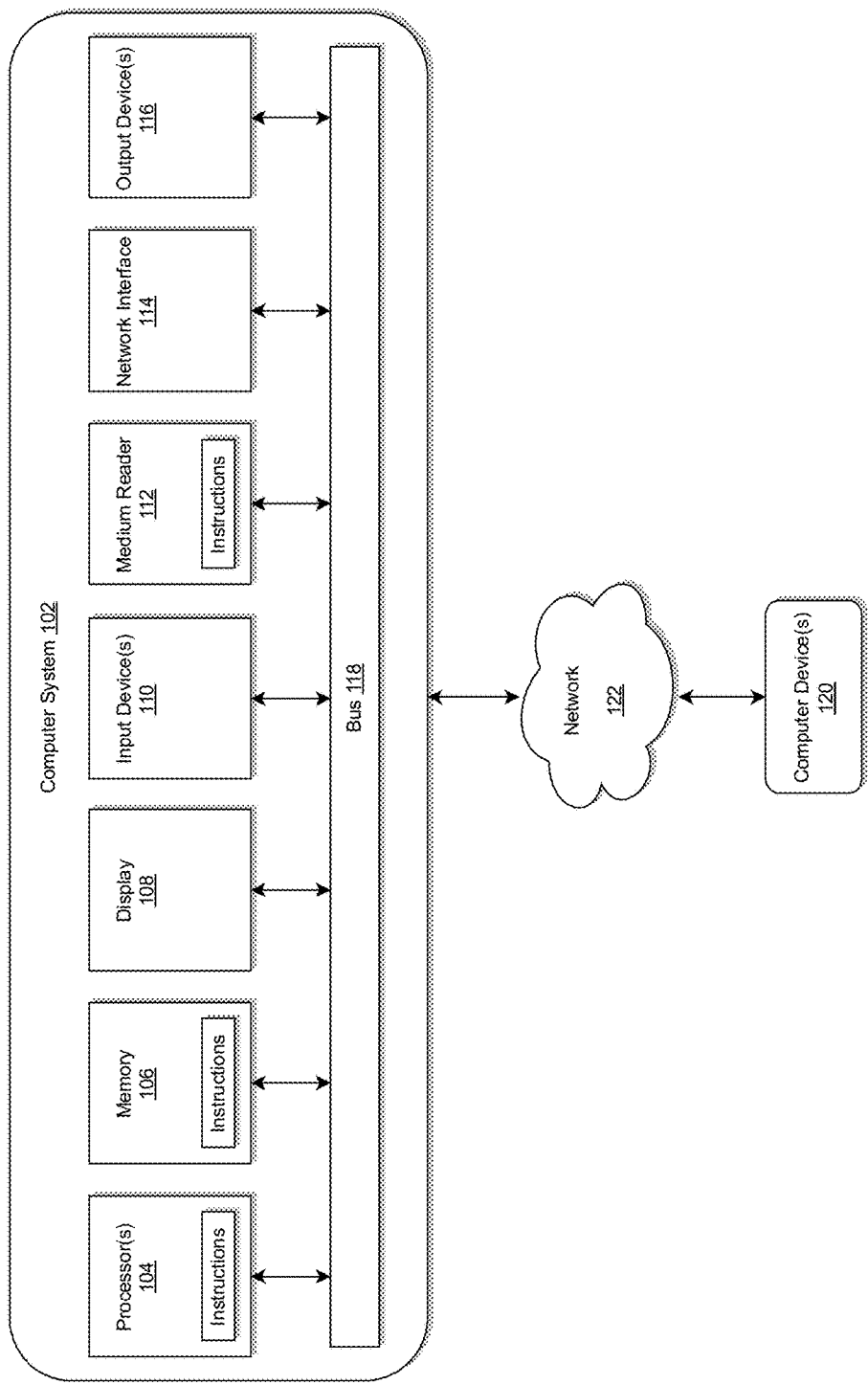
FIG. 1 illustrates a computer system for implementing a platform and language agnostic dynamic data processing module that may be configured to create a library or a framework that enables parsing and transforming of data dynamically and dynamic processing of expressions to be applied to the data hosted on an application server without depending on SSRS in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a platform and language agnostic dynamic data processing module that may be configured to create a library or a framework that enables parsing and transforming of data dynamically and dynamic processing of expressions to be applied to the data hosted on an application server without depending on SSRS in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the dynamic data processing module may be platform and language agnostic that may allow for consistent easy orchestration and passing of data through various components to output a desired result regardless of cloud environment, platform, or language. Since the disclosed process, according to exemplary embodiments, is platform and language agnostic, the dynamic processing module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
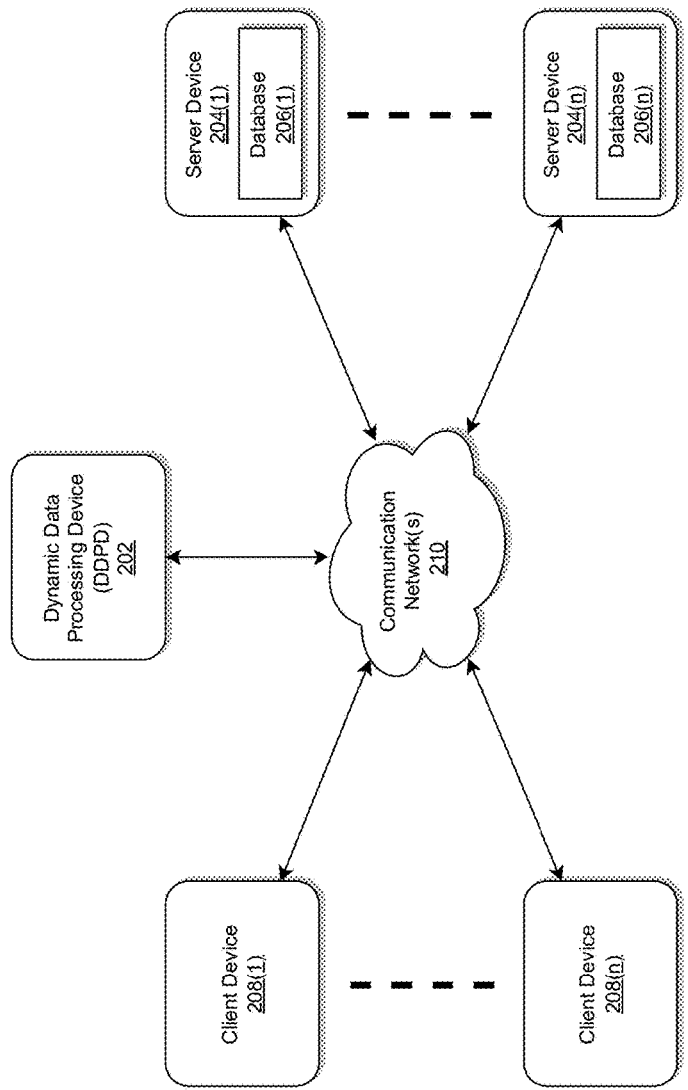
FIG. 2 illustrates an exemplary diagram of a network environment with a platform and language agnostic dynamic data processing device in accordance with an exemplary embodiment.

Referring to FIG. 2, a schematic of an exemplary network environment 200 for implementing a platform and language agnostic dynamic data processing device (DDPD) of the instant disclosure is illustrated.

According to exemplary embodiments, the above-described problems associated with conventional tools may be overcome by implementing a DDPD 202 as illustrated in FIG. 2 that may be configured for implementing a platform and language agnostic dynamic data processing module that may be configured to create a library or a framework that enables parsing and transforming of data dynamically and dynamic processing of expressions to be applied to the data hosted on an application server without depending on SSRS, but the disclosure is not limited thereto. For example, according to exemplary embodiments, the above-described problems associated with conventional tools may be overcome by implementing a DDPD 202 as illustrated in FIG. 2 that may be configured for implementing a platform and language agnostic dynamic data processing module that: allows data to not to leave the system for processing—unlike SSRS where data has to leave the system and is processed on SSRS Server; processes vast amount of data (often exceeding 450 PB) faster than conventional tools; is configured for processing a data stream and/or continuously flowing data; allows adding any new custom formulae or expressions needed for data processing; allows data procurement from a plurality of types of data sources; provides full control on the source code—can make enhancements or updates or changes as required; is configured for lightweight processing (a lightweight processing is an application/software development method that has only a few rules and practices, or only ones that are easy to follow) and without dependency on external components; is configured for easy integration with other projects; and has the ability to be hosted as a separate service, but the disclosure is not limited thereto.

The DDPD 202 may be the same or similar to the computer system 102 as described with respect to FIG. 1.

The DDPD 202 may store one or more applications that can include executable instructions that, when executed by the DDPD 202, cause the DDPD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DDPD 202 itself, may be located in virtual server(s) running in a cloud-based computing environment rather than being tied to one or more specific physical network computing devices. Also, the application(s) may be running in one or more virtual machines (VMs) executing on the DDPD 202. Additionally, in one or more embodiments of this technology, virtual machine(s) running on the DDPD 202 may be managed or supervised by a hypervisor.

In the network environment 200 of FIG. 2, the DDPD 202 is coupled to a plurality of server devices 204(1)-204(n) that hosts a plurality of databases 206(1)-206(n), and also to a plurality of client devices 208(1)-208(n) via communication network(s) 210. A communication interface of the DDPD 202, such as the network interface 114 of the computer system 102 of FIG. 1, operatively couples and communicates between the DDPD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DDPD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DDPD 202 may be a standalone device or integrated with one or more other devices or apparatuses, such as one or more of the server devices 204(1)-204(n), for example. In one particular example, the DDPD 202 may be hosted by one of the server devices 204(1)-204(n), and other arrangements are also possible. Moreover, one or more of the devices of the DDPD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DDPD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the DDPD 202 that may efficiently provide a platform for implementing a platform and language agnostic dynamic data processing module configured to create a library or a framework that enables parsing and transforming of data dynamically and dynamic processing of expressions to be applied to the data hosted on an application server without depending on SSRS, but the disclosure is not limited thereto. For example, according to exemplary embodiments, the client devices 208(1)-208(n) in this example may include any type of computing device that can facilitate the implementation of the DDPD 202 that may efficiently provide a platform for implementing a platform and language agnostic dynamic data processing module that: allows data to not to leave the system for processing—unlike SSRS where data has to leave the system and is processed on SSRS Server; processes vast amount of data (often exceeding 450 PB) faster than conventional tools; is configured for processing a data stream and/or continuously flowing data; allows adding any new custom formulae or expressions needed for data processing; allows data procurement from a plurality of types of data sources; provides full control on the source code—can make enhancements or updates or changes as required; is configured for lightweight processing (a lightweight processing is an application/software development method that has only a few rules and practices, or only ones that are easy to follow) and without dependency on external components; is configured for easy integration with other projects; and has the ability to be hosted as a separate service, but the disclosure is not limited thereto.

The client devices 208(1)-208(n) may run interface applications, such as standard web browsers or standalone client applications, which may provide an interface to communicate with the DDPD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the DDPD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the DDPD 202, the server devices 204(1)-204(n), or the client devices 208(1)-208(n), for example, may be configured to operate as virtual instances on the same physical machine. For example, one or more of the DDPD 202, the server devices 204(1)-204(n), or the client devices 208(1)-208(n) may operate on the same physical device rather than as separate devices communicating through communication network(s) 210. Additionally, there may be more or fewer DDPDs 202, server devices 204(1)-204(n), or client devices 208(1)-208(n) than illustrated in FIG. 2. According to exemplary embodiments, the DDPD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
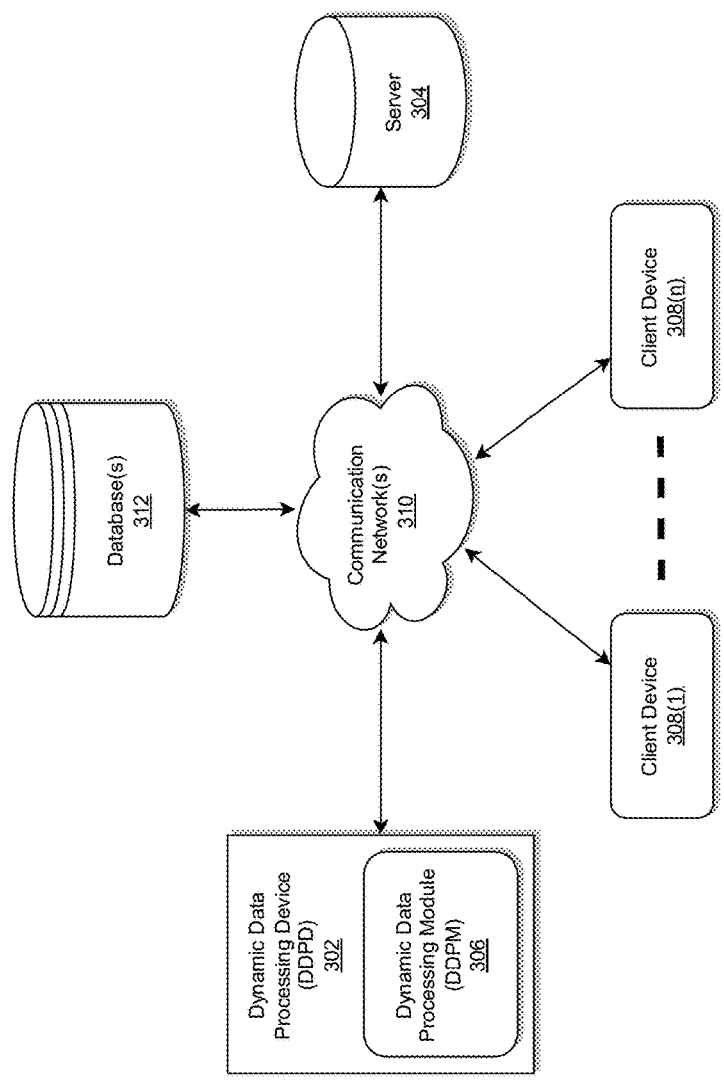
FIG. 3 illustrates a system diagram for implementing a platform and language agnostic dynamic data processing device having a platform and language agnostic dynamic data processing module in accordance with an exemplary embodiment.

FIG. 3 illustrates a system diagram for implementing a DDPD having a platform and language agnostic dynamic data processing module (DDPM) in accordance with an exemplary embodiment.

As illustrated in FIG. 3, the system 300 may include a DDPD 302 within which an DDPM 306 is embedded, a server 304, a database(s) 312, a plurality of client devices 308(1) . . . 308(n), and a communication network 310.

According to exemplary embodiments, the DDPD 302 including the DDPM 306 may be connected to the server 304, and the database(s) 312 via the communication network 310. The DDPD 302 may also be connected to the plurality of client devices 308(1) . . . 308(n) via the communication network 310, but the disclosure is not limited thereto.

According to exemplary embodiment, the DDPD 302 is described and shown in FIG. 3 as including the DDPM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a mainframe database, a log database that may produce programming for searching, monitoring, and analyzing machine-generated data via a web interface, etc., but the disclosure is not limited thereto.

According to exemplary embodiments, the DDPM 306 may be configured to receive real-time feed of data from the plurality of client devices 308(1) . . . 308(n) via the communication network 310.

As may be described below, the DDPM 306 may be configured to: host an application on a cloud server; receive data corresponding to the application from a plurality of types of data sources; define expressions to be applied to the data for parsing and transforming the data dynamically on the cloud server; validate the defined expressions based on a determination that each defined expression meets a predefined threshold value; generate a lookup data file in a predefined file format in response to validating the defined expressions; parse the lookup data file; dynamically transform the data based on the parsed lookup data file and applying the validated expressions; and generate an output file in the predefined file format for consumption after transforming the data, but the disclosure is not limited thereto.

The plurality of client devices 308(1) . . . 308(n) are illustrated as being in communication with the DDPD 302. In this regard, the plurality of client devices 308(1) . . . 308(n) may be "clients" (e.g., customers) of the DDPD 302 and are described herein as such. Nevertheless, it is to be known and understood that the plurality of client devices 308(1) . . . 308(n) need not necessarily be "clients" of the DDPD 302, or any entity described in association therewith herein. Any additional or alternative relationship may exist between either or both of the plurality of client devices 308(1) . . . 308(n) and the DDPD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the DDPD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The DDPD 302 may be the same or similar to the DDPD 202 as described with respect to FIG. 2, including any features or combination of features described with respect thereto.

Figure 4:
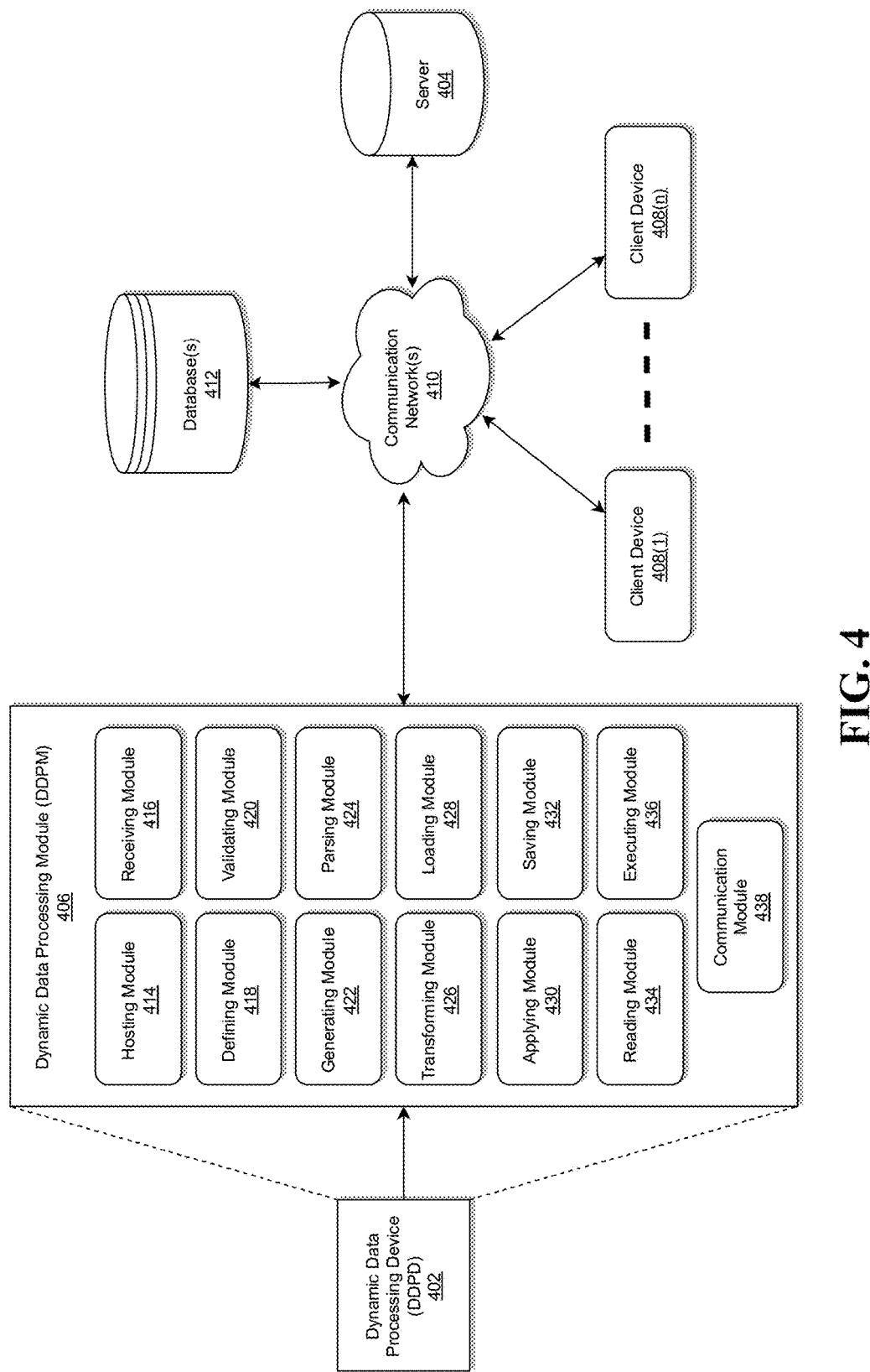
FIG. 4 illustrates a system diagram for implementing a platform and language agnostic dynamic data processing module of FIG. 3 in accordance with an exemplary embodiment.

FIG. 4 illustrates a system diagram for implementing a DDPM of FIG. 3 in accordance with an exemplary embodiment.

According to exemplary embodiments, the system 400 may include a platform and language agnostic DDPD 402 within which a platform and language agnostic DDPM 406 is embedded, a server 404, database(s) 412, and a communication network 410.

According to exemplary embodiments, the DDPD 402 including the DDPM 406 may be connected to the server 404 and the database(s) 412 via the communication network 410. The DDPD 402 may also be connected to the plurality of client devices 408(1)-408(n) via the communication network 410, but the disclosure is not limited thereto. The DDPM 406, the server 404, the plurality of client devices 408(1)-408(n), the database(s) 412, the communication network 410 as illustrated in FIG. 4 may be the same or similar to the DDPM 306, the server 304, the plurality of client devices 308(1)-308(n), the database(s) 312, the communication network 310, respectively, as illustrated in FIG. 3.

According to exemplary embodiments, as illustrated in FIG. 4, the DDPM 406 may include a hosting module 414, a receiving module 416, a defining module 418, a validating module 420, a generating module 422, a parsing module 424, a transforming module 426, a loading module 428, an applying module 430, a saving module 432, a reading module 434, an executing module 436, and a communication module 438. According to exemplary embodiments, interactions and data exchange among these modules included in the DDPM 406 provide the advantageous effects of the disclosed invention. Functionalities of each module of FIG. 4 may be described in detail below with reference to FIGS. 4-6.

According to exemplary embodiments, each of the hosting module 414, receiving module 416, defining module 418, validating module 420, generating module 422, parsing module 424, transforming module 426, loading module 428, applying module 430, saving module 432, reading module 434, executing module 436, and the communication module 438 of the DDPM 406 of FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the hosting module 414, receiving module 416, defining module 418, validating module 420, generating module 422, parsing module 424, transforming module 426, loading module 428, applying module 430, saving module 432, reading module 434, executing module 436, and the communication module 438 of the DDPM 406 of FIG. 4 may be implemented by microprocessors or similar, and may be programmed using software (e.g., microcode) to perform various functions discussed herein and may optionally be driven by firmware and/or software.

Alternatively, according to exemplary embodiments, each of the hosting module 414, receiving module 416, defining module 418, validating module 420, generating module 422, parsing module 424, transforming module 426, loading module 428, applying module 430, saving module 432, reading module 434, executing module 436, and the communication module 438 of the DDPM 406 of FIG. 4 may be implemented by dedicated hardware, or as a combination of dedicated hardware to perform some functions and a processor (e.g., one or more programmed microprocessors and associated circuitry) to perform other functions.

According to exemplary embodiments, each of the hosting module 414, receiving module 416, defining module 418, validating module 420, generating module 422, parsing module 424, transforming module 426, loading module 428, applying module 430, saving module 432, reading module 434, executing module 436, and the communication module 438 of the DDPM 406 of FIG. 4 may be called via corresponding API.

According to exemplary embodiments, the process may be executed via the communication module 438 and the communication network 410, which may comprise plural networks as described above. For example, in an exemplary embodiment, the various components of the DDPM 406 may communicate with the server 404, and the database(s) 412 via the communication module 438 and the communication network 410. Of course, these embodiments are merely exemplary and are not limiting or exhaustive.

According to exemplary embodiments, the hosting module 414 may be configured to host an application on a cloud server. The receiving module 416 may be configured to receive data corresponding to the application from a plurality of types of data sources. The defining module 418 may be configured to define expressions to be applied to the data for parsing and transforming the data dynamically on the cloud server (i.e., the server 404). The validating module 420 may be configured to validate the defined expressions based on a determination that each defined expression meets a predefined threshold value. The generating module 422 may be configured to generate a lookup data file in a predefined file format in response to validating the defined expressions. The parsing module 424 may be configured to parse the lookup data file. The transforming module 426 may be configured to dynamically transform the data based on the parsed lookup data file and the applying module 430 may be configured to apply the validated expressions. The generating module 422 may be further configured to generate an output file in the predefined file format for consumption after transforming the data.

According to exemplary embodiments, the data may be a data stream, and the loading module 428 may be configured to loading the entire lookup data file in a memory (i.e., memory 106 as illustrated in FIG. 1); and in response, the applying module 430 may be configured to apply the defined expressions on the data stream for processing. According to exemplary embodiments, the saving module 432 may be configured to save the processed data stream into an intermediate file; and in response, the loading module 428 may be configured to load the processed data into the memory for additional operations. In addition, according to exemplary embodiments, the reading module 434 may be further configured to read the entire intermediate file when it is determined that additional operations are needed, and in response, the executing module 436 may be further configured to execute the additional operations. The transforming module 426 may be further configured to dynamically transforming the data based on executing the additional operations; and in response, the saving module 432 may be further configured to save the dynamically processed data back to the lookup data file in the predefined file format for consumption.

According to exemplary embodiments, the additional operations may include one or more of the following: grouping operations, row splitting operations, and filtering operations, but the disclosure is not limited thereto.

According to exemplary embodiments, the predefined file format may include one or more of the following file formats: JSON file format, CSV file format, data table file format, dictionary file format, PDF file format, Excel file format, etc., but the disclosure is not limited thereto. The predefined file format may include any other desired file format without departing from the scope of the present disclosure.

According to exemplary embodiments, the cloud server may be a public cloud server or a private cloud server. For example, the public cloud may include one or more of the following: AWS Aurora, AWS RDS, AWS Cassandra, Google public cloud, etc., but the disclosure is not limited thereto. The private cloud may include one or more of the following: GOS, Cassandra, Cockroach, etc., but the disclosure is not limited thereto.

According to exemplary embodiments, the validating module 420 may be configured to validate the defined expressions for syntax and expected calculation processes by comparing with prestored library of functions corresponding to data transformation.

According to exemplary embodiments, the defined expressions may include one or more of the following expressions: calculation expressions, grouping expressions, filtering expressions, sorting expressions, and row visibility expressions, but the disclosure is not limited thereto.

Figure 5A:
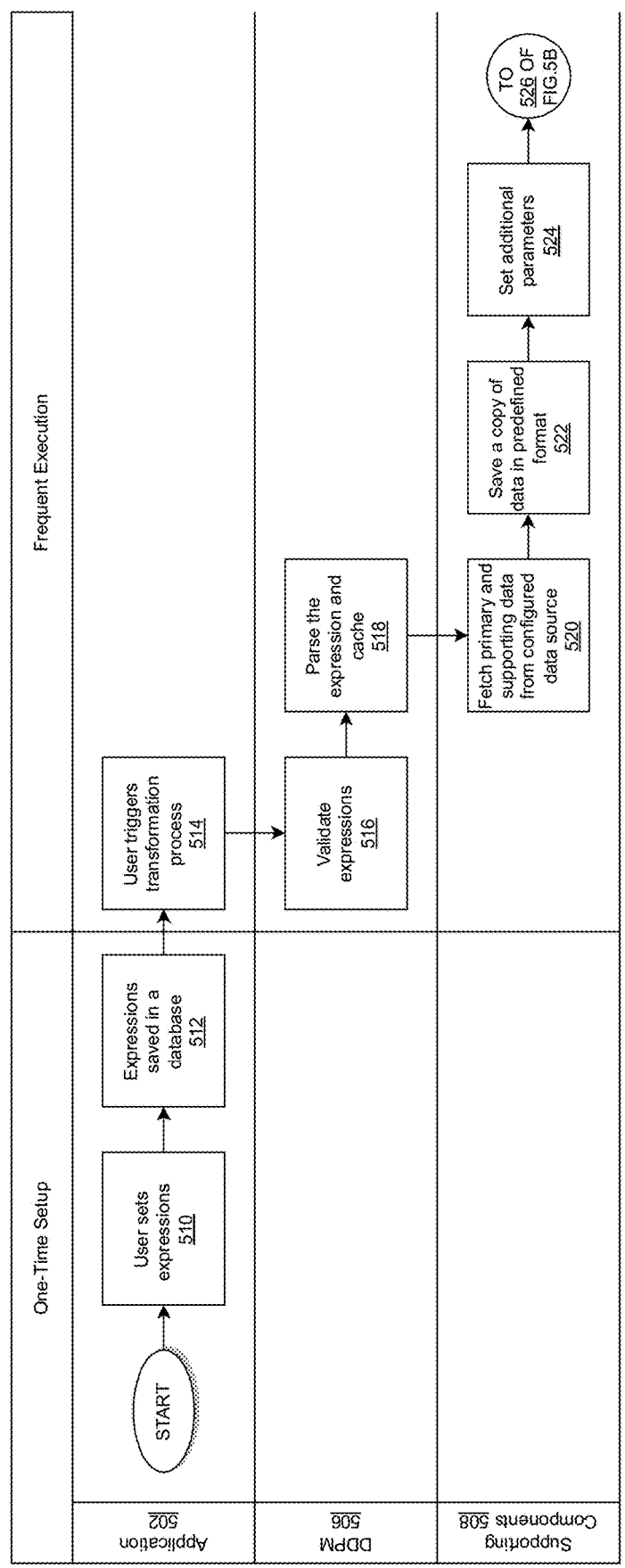
FIGS. 5A and 5B, in combination, illustrate an exemplary low or medium volume transformation process implemented by the platform and language agnostic dynamic data processing module of FIG. 4 in accordance with an exemplary embodiment.
Figure 5B:
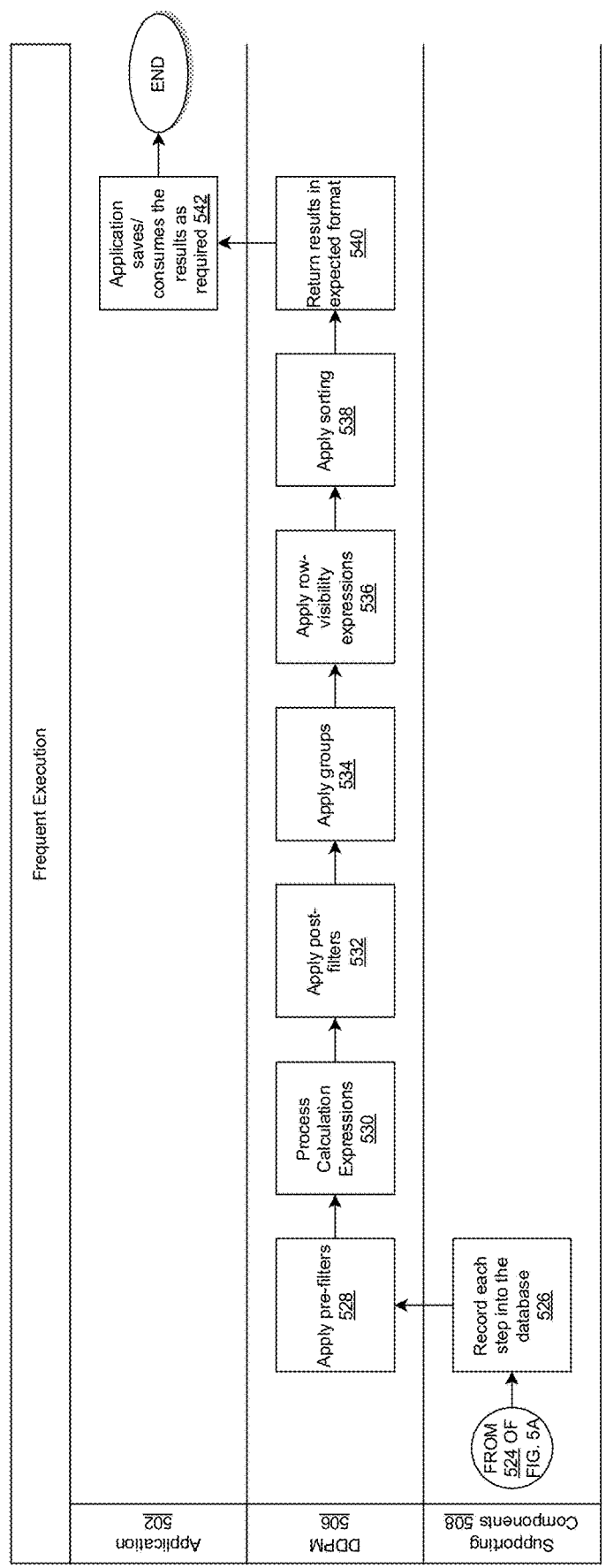

FIGS. 5A and 5B, in combination, illustrate an exemplary low or medium volume transformation process 500 implemented by the platform and language agnostic DDPM 406 of FIG. 4 in accordance with an exemplary embodiment. As illustrated in FIGS. 5A and 5B, the low or medium volume transformation process 500 may include a one-time setup process and a frequent execution process. The low or medium volume transformation process 500 may also include an application layer where an application 502 is hosted, a module processing layer where the DDPM 406 is hosted and supporting component layer where supporting components are hosted. As illustrated in FIGS. 5A and 5B, the one-time setup may include steps 510 and 512 and the frequent execution process may include the remaining steps (i.e., steps 514, 516, 518, 520, 522, 524, 526, 528, 530, 532, 534, 536, 538, 540, and 542). In addition, the application layer of the process 500 may include steps 510, 512, 514, 542; the module processing layer of the process 500 may include steps 516, 518, 528, 530, 532, 534, 536, 538, and 540; and the supporting components layer of the process 500 may include steps 520, 522, 524, and 526.

According to exemplary embodiments, during the low or medium volume transformation process 500, data size less than 100,000 records or less than 1 GB data are utilized for transformation, but the disclosure is not limited thereto. Whereas, during high volume transformation process 500, data size more than 100,000 records or more than 1 GB data are utilized for transformation, but the disclosure is not limited thereto.

According to exemplary embodiments, as illustrated in FIG. 5A, at step 510 of the process 500, a user may set expressions and at step 512 the expressions may be saved in a database (i.e., database(s) 412 as illustrated in FIG. 4). At step 514, the process 500 may include triggering a low or medium volume transformation process. At step 516, the process 500 may include validating expressions and step 518, the process 500 may include parsing the expression and caching. For example, validation may be determined during the processing phase when the expressions are initially validated, parsed, and then cached.

The DDPM 506 may be configured to provide a built-in library of functions. This library can be extended and customized as required for future requirements.

According to exemplary embodiments, at step 520 the process 500 fetches primary and supporting data from configured data source. At step 522, the process 500 saves a copy of the fetched primary and supporting data in a predefined format. At step 524, the process 500 sets additional parameters.

According to exemplary embodiments, as illustrated in FIG. 5B, at step 526 of the process 500, each setup may be recorded into the database(s) 412 as illustrated in FIG. 4. At step 528, the process 500 applies pre-filters. At step 530, the process 500 processes calculation expressions. At step 532, the process 500 applies post-filters. At step 534, the process 500 apply groups (i.e., grouping expressions). At step 536, the process 500 applies row-visibility expressions. At step 538, the process 500 applies sorting and at step 540 the process 500 returns results in the expected format. And at step 542, the application 502 saves or consumes the results as required. According to exemplary embodiments, supported formats are JSON, Dictionary, CSV File, C#DataTable, but can be extended as required.

Figure 6:
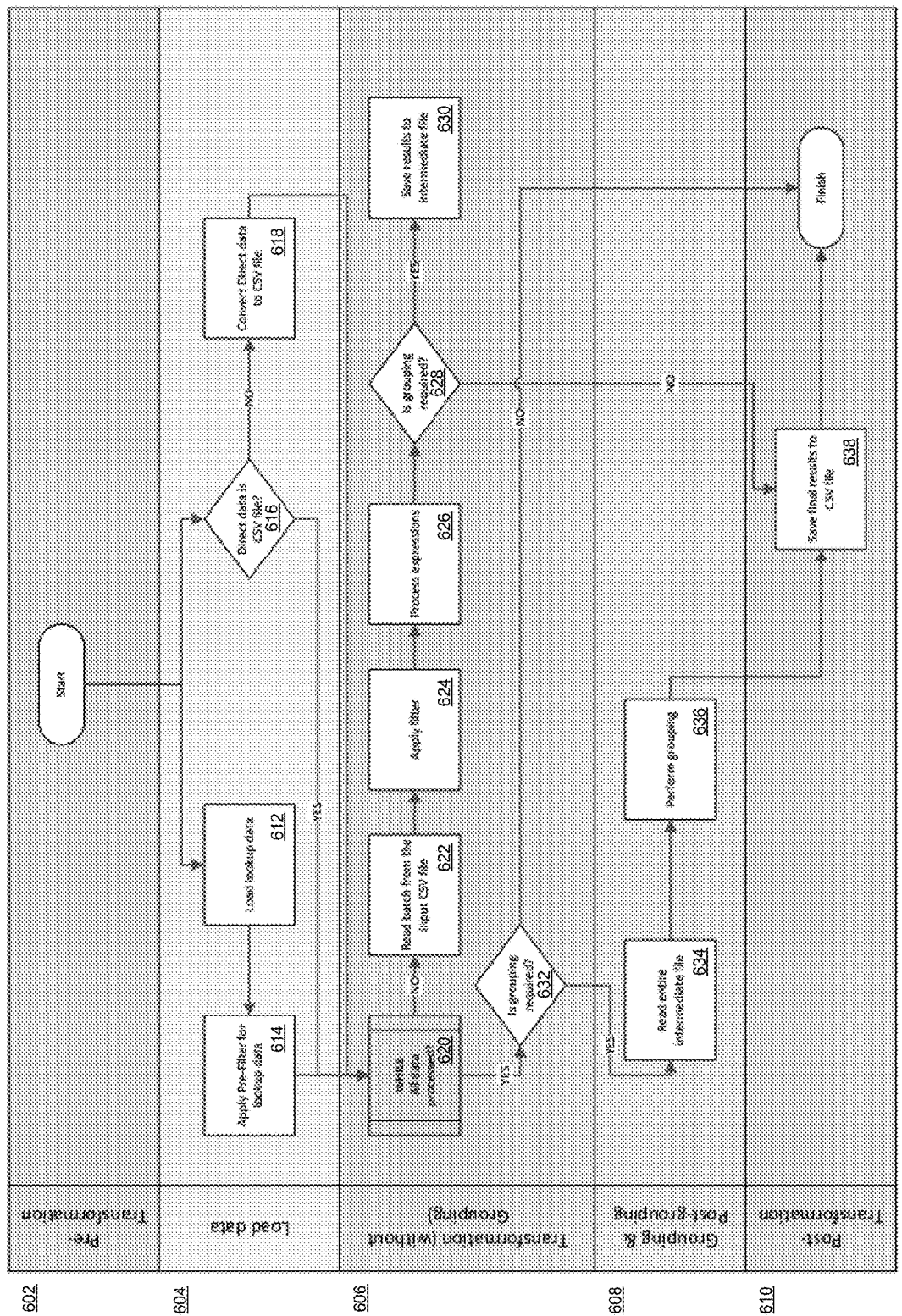
FIG. 6 illustrates an exemplary high volume transformation process implemented by the platform and language agnostic dynamic data processing module of FIG. 4 in accordance with an exemplary embodiment.

FIG. 6 illustrates an exemplary high volume transformation process 600 implemented by the platform and language agnostic DDPM 406 of FIG. 4 in accordance with an exemplary embodiment. As illustrated in FIG. 6, the high volume transformation process 600 may include a pre-transformation process 602, a load data process 604, a transformation (without grouping) process 606, a grouping and post-grouping process 608 and a pos-transformation process.

As illustrated in FIG. 6, the pre-transformation process 602 starts the process 600. The load data process 604 executes steps 612, 614, 616 and 618. The transformation (without grouping) process 606 executes steps 620, 622, 624, 626, 628, 630 and 632. The grouping and post-grouping process 608 executes steps 634 and 636 and the post-transformation process 610 executes step 638 and finishes the process 600.

According to exemplary embodiments, at step 612, the process 600 loads lookup data. At step 614, the process 600 applies pre-filter for the lookup data. At step 616, the process 600 determines whether the direct data received from a plurality of data sources is in a predefined file format, e.g., CSV file format. If it is determined at step 616 that the direct data is not in the CSV file format, at step 618 the process 600 converts the direct data to CSV file format, and saves the CSV file and then the process 600 proceeds to step 620. If it is determined at step 616 that the direct data is in the CSV file format, the process 600 proceeds to step 620. At step 620, the process 600 determines whether all received data has been processed.

If it is determined at step 620 that all received data has not been processed, at step 622, the process 600 reads batch from the input CSV file. At step 624, the process 600 applies filters and at step 626 the process 600 processes expressions set by a user as disclosed herein. At step 628, the process 600 determines whether grouping is required. If it is determined at step 628 that grouping is required, at step 630 the process 600 saves results to an intermediate file. If it is determined at step 628 that grouping is not required, the process 600 proceeds to step 638 where the process 600 saves final results to the CSV file and the process 600 then finishes the high volume transformation process.

According to exemplary embodiments, if it is determined at step 620 that all received data has been processed, at step 632, the process 600 again determines whether grouping is required. If it is determined at step 632 that grouping is required, at step 634 the process 600 reads the entire intermediate file previously saved at step 630. At step 636, the process 600 performs grouping based on received grouping instructions from a user. At step 638, the process saves final results to the CSV file and finishes the high volume transformation process. If it is determined at step 632 that grouping is not required, the process 600 finishes the high volume transformation process.

Figure 7:
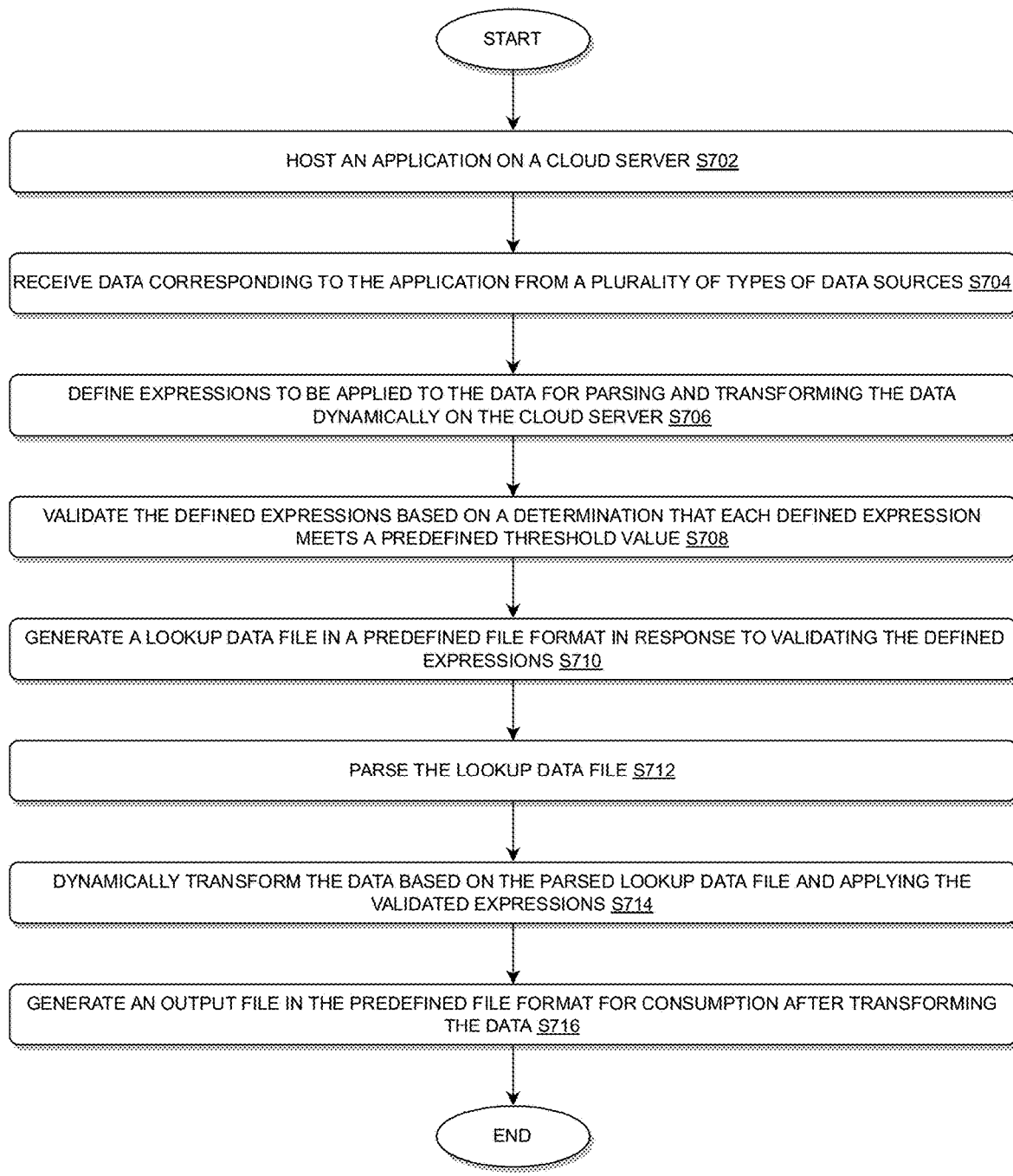
FIG. 7 illustrates an exemplary flow chart implemented by the platform and language agnostic dynamic data processing module of FIG. 4 for creating a library or a framework that enables parsing and transforming of data dynamically and dynamic processing of expressions to be applied to the data hosted on an application server without depending on SSRS in accordance with an exemplary embodiment.

As illustrated in FIG. 7 illustrates an exemplary flow chart 700 implemented by the DDPM 406 of FIG. 4 for creating a library or a framework that enables parsing and transforming of data dynamically and dynamic processing of expressions to be applied to the data hosted on an application server without depending on SSRS in accordance with an exemplary embodiment. It may be appreciated that the illustrated process 700 and associated steps may be performed in a different order, with illustrated steps omitted, with additional steps added, or with a combination of reordered, combined, omitted, or additional steps.

As illustrated in FIG. 7, at step S702, the process 700 may include hosting an application on a cloud server.

At step S704, the process 700 may include receiving data corresponding to the application from a plurality of types of data sources.

At step S706, the process 700 may include defining expressions to be applied to the data for parsing and transforming the data dynamically on the cloud server. For example, a user may set the calculation expressions, grouping expressions, filtering expressions, sorting expressions, row visibility expressions and data source options. The process 700 may include saving the setup onto a database as disclosed herein.

At step S708, the process 700 may include validating the defined expressions based on a determination that each defined expression meets a predefined threshold value.

At step S710, the process 700 may include generating a lookup data file in a predefined file format in response to validating the defined expressions.

At step S712, the process 700 may include parsing the lookup data file. The process 700 may further include fetching the primary and supporting data from configured data source (i.e., file, external service, application itself, other internal services, etc., but the disclosure is not limited thereto. The process 700 may further include saving a copy of this primary and supporting data in JSON format for further reference. According to exemplary embodiments, the process 700 may further include setting additional parameters, visibility expressions, degree of parallelism, etc. In addition, the process 700 may include setting the option to proceed on error.

At step S714, the process 700 may include dynamically transforming the data based on the parsed lookup data file and applying the validated expressions.

At step S716, the process 700 may include generating an output file in the predefined file format for consumption after transforming the data.

According to exemplary embodiments, the data may be a data stream, and the process 700 may further include: loading the entire lookup data file in a memory; applying the defined expressions on the data stream for processing; saving the processed data stream into an intermediate file; loading the processed data into the memory for additional operations; reading the entire intermediate file when it is determined that additional operations are needed; executing the additional operations; dynamically transforming the data based on executing the additional operations; and saving the dynamically processed data back to the lookup data file in the predefined file format for consumption.

According to exemplary embodiments, in the process 700, the additional operations may include one or more of the following: grouping operations, row splitting operations, and filtering operations, but the disclosure is not limited thereto.

According to exemplary embodiments, in the process 700, the predefined file format may include one or more of the following file formats: JSON file format, CSV file format, data table file format, dictionary file format, PDF file format, and Excel file format, but the disclosure is not limited thereto.

According to exemplary embodiments, in the process 700, the cloud server may be a public cloud server or a private cloud server.

According to exemplary embodiments, the process 700 may further include: validating the defined expressions for syntax and expected calculation processes by comparing with prestored library of functions corresponding to data transformation.

According to exemplary embodiments, in the process 700, the defined expressions may include one or more of the following expressions: calculation expressions, grouping expressions, filtering expressions, sorting expressions, and row visibility expressions, but the disclosure is not limited thereto.

According to exemplary embodiments, the process 700 may further include recording each step (i.e., expression validation and parsing, fetching primary and supporting data, transforming expressions, saving output, etc.) disclosed herein into a database. And then, the process may apply pre-filters to delete invalid expressions, process calculation expressions, apply post-filters, apply groups, apply row-visibility expressions, apply sorting, and return results in expected format. The application saves/consumes the results as required.

According to exemplary embodiments, the DDPD 402 may include a memory (e.g., a memory 106 as illustrated in FIG. 1) which may be a non-transitory computer readable medium that may be configured to store instructions for implementing a DDPM 406 for creating a library or a framework that enables parsing and transforming of data dynamically and dynamic processing of expressions to be applied to the data hosted on an application server without depending on SSRS as disclosed herein. The DDPD 402 may also include a medium reader (e.g., a medium reader 112 as illustrated in FIG. 1) which may be configured to read any one or more sets of instructions, e.g., software, from any of the memories described herein. The instructions, when executed by a processor embedded within the DDPM 406, 506 or within the DDPD 402, may be used to perform one or more of the methods and processes as described herein. In a particular embodiment, the instructions may reside completely, or at least partially, within the memory 106, the medium reader 112, and/or the processor 104 (see FIG. 1) during execution by the DDPD 402.

According to exemplary embodiments, the instructions, when executed, may cause a processor embedded within the DDPM 406 or the DDPD 402 to perform the following: hosting an application on a cloud server; receiving data corresponding to the application from a plurality of types of data sources; defining expressions to be applied to the data for parsing and transforming the data dynamically on the cloud server; validating the defined expressions based on a determination that each defined expression meets a predefined threshold value; generating a lookup data file in a predefined file format in response to validating the defined expressions; parsing the lookup data file; dynamically transforming the data based on the parsed lookup data file and applying the validated expressions; and generating an output file in the predefined file format for consumption after transforming the data. According to exemplary embodiments, the processor may be the same or similar to the processor 104 as illustrated in FIG. 1 or the processor embedded within DDPD 202, DDPD 302, DDPD 402, and DDPM 406.

According to exemplary embodiments, the data may be a data stream, and the instructions, when executed, may cause the processor 104 to further perform the following: loading the entire lookup data file in a memory; applying the defined expressions on the data stream for processing; saving the processed data stream into an intermediate file; loading the processed data into the memory for additional operations; reading the entire intermediate file when it is determined that additional operations are needed; executing the additional operations; dynamically transforming the data based on executing the additional operations; and saving the dynamically processed data back to the lookup data file in the predefined file format for consumption.

According to exemplary embodiments, the instructions, when executed, may cause the processor 104 to further perform the following: validating the defined expressions for syntax and expected calculation processes by comparing with prestored library of functions corresponding to data transformation.

According to exemplary embodiments as disclosed above in FIGS. 1-7, technical improvements effected by the instant disclosure may include a platform for implementing a platform and language agnostic dynamic data processing module configured to create a library or a framework that enables parsing and transforming of data dynamically and dynamic processing of expressions to be applied to the data hosted on an application server without depending on SSRS, but the disclosure is not limited thereto. For example, according to exemplary embodiments as disclosed above in FIGS. 1-7, technical improvements effected by the instant disclosure may include a platform for implementing a platform and language agnostic dynamic data processing module that: allows data to not to leave the system for processing—unlike SSRS where data has to leave the system and is processed on SSRS Server; processes vast amount of data (often exceeding 450 PB) faster than conventional tools; is configured for processing a data stream and/or continuously flowing data; allows adding any new custom formulae or expressions needed for data processing; allows data procurement from a plurality of types of data sources; provides full control on the source code—can make enhancements or updates or changes as required; is configured for lightweight processing (a lightweight processing is an application/software development method that has only a few rules and practices, or only ones that are easy to follow) and without dependency on external components; is configured for easy integration with other projects; and has the ability to be hosted as a separate service, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for dynamic data processing on a cloud environment by utilizing one or more processors along with allocated memory, the method comprising:
    implementing a platform and language agnostic dynamic data processing module (DDPM) configured to create a library or a framework that enables parsing and transforming of data dynamically and dynamic processing of expressions to be applied to the data hosted on an application server without depending on Structured Query Language Server Reporting Services (SSRS), the DDPM including a hosting module, a receiving module, a defining module, a validating module, a generating module, a parsing module, a loading module, applying module, saving module, reading module, executing module, and a transforming module, wherein each module being called via corresponding Application Programming Interface (API);
    hosting, by calling the hosting module via a first API, an application on a cloud server;
    receiving, by calling the receiving module via a second API, data corresponding to the application from a plurality of types of data sources;
    defining, by calling the defining module via a third API, expressions to be applied to the data for parsing and transforming the data dynamically on the cloud server;
    validating, by calling the validating module via a fourth API, the defined expressions based on a determination that each defined expression meets a predefined threshold value;
    generating, by calling the generating module via a fifth API, a lookup data file in a predefined file format in response to validating the defined expressions;
    parsing, by calling the parsing module via a sixth API, the lookup data file;
    dynamically transforming, by calling the transforming module via a seventh API, the data based on the parsed lookup data file and applying the validated expressions; and
    generating, by calling the generating module via the fifth API, an output file in the predefined file format for consumption after transforming the data,
    wherein the data is a data stream, and the method further comprising:
    loading the entire lookup data file in a memory by calling the loading module via a corresponding API;

applying the defined expressions on the data stream for processing by calling the applying module via a corresponding API;
saving the processed data stream into an intermediate file by calling the saving module via a corresponding API;
loading the processed data into the memory for additional operations by calling the loading module via the corresponding API;
reading the entire intermediate file when it is determined that additional operations are needed by calling the reading module via a corresponding API;
executing the additional operations by calling the executing module via a corresponding API;
dynamically transforming the data based on executing the additional operations by calling the transforming module via the seventh API; and
saving the dynamically processed data back to the lookup data file in the predefined file format for consumption by calling the calling the saving module via a corresponding API.

2. The method according to claim 1, wherein the additional operations includes one or more of the following: grouping operations, row splitting operations, and filtering operations.

3. The method according to claim 1, wherein the predefined file format includes one or more of the following file formats: Java Script Object Notation file format, Comma Separated Values (CSV) file format, data table file format, dictionary file format, PDF file format, and excel file format.

4. The method according to claim 1, wherein the cloud server is a public cloud server or a private cloud server.

5. The method according to claim 1, further comprising:
validating the defined expressions for syntax and expected calculation processes by comparing with prestored library of functions corresponding to data transformation.

6. The method according to claim 1, wherein the defined expressions include one or more of the following expressions: calculation expressions, grouping expressions, filtering expressions, sorting expressions, and row visibility expressions.

7. A system for dynamic data processing on a cloud environment, the system comprising:
a processor; and
a memory operatively connected to the processor via a communication interface, the memory storing computer readable instructions, when executed, causes the processor to:
implement a platform and language agnostic dynamic data processing module (DDPM) configured to create a library or a framework that enables parsing and transforming of data dynamically and dynamic processing of expressions to be applied to the data hosted on an application server without depending on Structured Query Language Server Reporting Services (SSRS), the DDPM including a hosting module, a receiving module, a defining module, a validating module, a generating module, a parsing module, a loading module, applying module, saving module, reading module, executing module, and a transforming module, wherein each module being called via corresponding Application Programming Interface (API);
host, by calling the hosting module via a first API, an application on a cloud server;
receive, by calling the receiving module via a second API, data corresponding to the application from a plurality of types of data sources;
define, by calling the defining module via a third API, expressions to be applied to the data for parsing and transforming the data dynamically on the cloud server;
validate, by calling the validating module via a fourth API, the defined expressions based on a determination that each defined expression meets a predefined threshold value;
generate, by calling the generating module via a fifth API, a lookup data file in a predefined file format in response to validating the defined expressions;
parse, by calling the parsing module via a sixth API, the lookup data file;
dynamically transform, by calling the transforming module via a seventh API, the data based on the parsed lookup data file and applying the validated expressions; and
generate, by calling the generating module via the fifth API, an output file in the predefined file format for consumption after transforming the data,
wherein the data is a data stream, and the processor is further configured to:
load the entire lookup data file in a memory by calling the loading module via a corresponding API;
apply the defined expressions on the data stream for processing by calling the applying module via a corresponding API;
save the processed data stream into an intermediate file by calling the saving module via a corresponding API;
load the processed data into the memory for additional operations by calling the loading module via the corresponding API;
read the entire intermediate file when it is determined that additional operations are needed by calling the reading module via a corresponding API;
execute the additional operations by calling the executing module via a corresponding API;
dynamically transform the data based on executing the additional operations by calling the transforming module via the seventh API; and
save the dynamically processed data back to the lookup data file in the predefined file format for consumption by calling the calling the saving module via a corresponding API.

8. The system according to claim 7, wherein the additional operations includes one or more of the following: grouping operations, row splitting operations, and filtering operations.

9. The system according to claim 7, wherein the predefined file format includes one or more of the following file formats: Java Script Object Notation file format, Comma Separated Values (CSV) file format, data table file format, dictionary file format, PDF file format, and excel file format.

10. The system according to claim 7, wherein the cloud server is a public cloud server or a private cloud server.

11. The system according to claim 7, wherein the processor is further configured to:
validate the defined expressions for syntax and expected calculation processes by comparing with prestored library of functions corresponding to data transformation.

12. The system according to claim 7, wherein the defined expressions include one or more of the following expressions: calculation expressions, grouping expressions, filtering expressions, sorting expressions, and row visibility expressions.

13. A non-transitory computer readable medium configured to store instructions for dynamic data processing on a cloud environment, the instructions, when executed, cause a processor to perform the following:

implementing a platform and language agnostic dynamic data processing module (DDPM) configured to create a library or a framework that enables parsing and transforming of data dynamically and dynamic processing of expressions to be applied to the data hosted on an application server without depending on Structured Query Language Server Reporting Services (SSRS), the DDPM including a hosting module, a receiving module, a defining module, a validating module, a generating module, a parsing module, a loading module, applying module, saving module, reading module, executing module, and a transforming module, wherein each module being called via corresponding Application Programming Interface (API);

hosting, by calling the hosting module via a first API, an application on a cloud server;

receiving, by calling the receiving module via a second API, data corresponding to the application from a plurality of types of data sources;

defining, by calling the defining module via a third API, expressions to be applied to the data for parsing and transforming the data dynamically on the cloud server;

validating, by calling the validating module via a fourth API, the defined expressions based on a determination that each defined expression meets a predefined threshold value;

generating, by calling the generating module via a fifth API, a lookup data file in a predefined file format in response to validating the defined expressions;

parsing, by calling the parsing module via a sixth API, the lookup data file;

dynamically transforming, by calling the transforming module via a seventh API, the data based on the parsed lookup data file and applying the validated expressions; and generating, by calling the generating module via the fifth API, an output file in the predefined file format for consumption after transforming the data, wherein the data is a data stream, and the instructions, when executed, cause the processor to further perform the following:

loading the entire lookup data file in a memory by calling the loading module via a corresponding API;

applying the defined expressions on the data stream for processing by calling the applying module via a corresponding API;

saving the processed data stream into an intermediate file by calling the saving module via a corresponding API;

loading the processed data into the memory for additional operations by calling the loading module via the corresponding API;

reading the entire intermediate file when it is determined that additional operations are needed by calling the reading module via a corresponding API;

executing the additional operations by calling the executing module via a corresponding API;

dynamically transforming the data based on executing the additional operations by calling the transforming module via the seventh API; and saving the dynamically processed data back to the lookup data file in the predefined file format for consumption by calling the calling the saving module via a corresponding API.

14. The non-transitory computer readable medium according to claim 13, wherein the additional operations includes one or more of the following: grouping operations, row splitting operations, and filtering operations.

15. The non-transitory computer readable medium according to claim 13, wherein the predefined file format includes one or more of the following file formats: Java Script Object Notation file format, Comma Separated Values (CSV) file format, data table file format, dictionary file format, PDF file format, and excel file format.

16. The non-transitory computer readable medium according to claim 13, wherein the cloud server is a public cloud server or a private cloud server.

17. The non-transitory computer readable medium according to claim 13, wherein the instructions, when executed, cause the processor to further perform the following:

validating the defined expressions for syntax and expected calculation processes by comparing with prestored library of functions corresponding to data transformation, and wherein the defined expressions include one or more of the following expressions: calculation expressions, grouping expressions, filtering expressions, sorting expressions, and row visibility expressions.

* * * * *